United States Patent [19]

Nakayama

[11] Patent Number: 5,090,161
[45] Date of Patent: Feb. 25, 1992

[54] METHOD OF PRODUCING CURVED-TOOTHED BEVEL GEAR

[75] Inventor: Akira Nakayama, Fujisawa, Japan

[73] Assignee: Nissan Motor Company, Ltd., Japan

[21] Appl. No.: 429,095

[22] Filed: Oct. 31, 1989

[30] Foreign Application Priority Data

Nov. 10, 1988 [JP] Japan .................. 63-284302

[51] Int. Cl.$^5$ .............................................. B24B 1/00
[52] U.S. Cl. ........................................ 51/287; 51/324; 51/26; 51/322
[58] Field of Search ............ 51/287, 26, 323, 324, 51/322

[56] References Cited

U.S. PATENT DOCUMENTS 3,099,901 8/1963 Hunkeler ............................ 51/26
3,807,094 4/1974 Ellwanger ........................ 51/287
4,761,867 8/1988 Vollmer et al. .................. 51/287

FOREIGN PATENT DOCUMENTS

3333845A1 9/1983 Fed. Rep. of Germany .

OTHER PUBLICATIONS

Article titled "Verzahanen", VDI-Z Eitschrift 120 (1978) Nr. 20.

Primary Examiner—Robert A. Rose
Attorney, Agent, or Firm—Lowe, Price, LeBlanc & Becker

[57] ABSTRACT

In production of a curved-toothed bevel gear, an amount of deformation of a bottom land of each of gear teeth caused by heat treatment is assumed. The gear teeth are generated so that a bottom land of each of the teeth is of such a shape for compensating for the deformation.

5 Claims, 2 Drawing Sheets

METHOD OF PRODUCING CURVED-TOOTHED BEVEL GEAR

BACKGROUND OF THE INVENTION

1. Field of the Invention

The present invention relates in general to curved-toothed bevel gears and more particularly to a method of producing same.

2. Description of the Prior Art

The term "curved-toothed bevel gear" is herein used as indicating a category in which spiral bevel gears, hypoid gears and other curved-toothed bevel gears are included.

An example of a curved-toothed bevel gear is shown in FIG. 3 and generally indicated by 1. The bevel gear 1 is exemplarily shown as being an external bevel gear with tooth surfaces 2 and bottom lands 4 and meshed with a pinion 3 the teeth of which are curved correspondingly.

In production of such a curved-toothed bevel gear, a gear-generating machine is used to generate gear teeth on a blank 10 as shown by dotted lines in FIG. 4. The toothed blank 10 is then processed by heat treatment as carburizing, etc. After that, the gear teeth, i.e., the faces 20 and bottom lands 40 of the toothed blank 10 are finish-ground into the tooth surfaces 2 and bottom lands 4 for thereby obtaining the bevel gear 1.

In the grinding of the gear teeth, it is known to grind the bottom lands 40 and its adjacent tooth surfaces 20 of the toothed blank 10 at the same time by means of a grinding wheel. In such a case, grinding lubricant is used to lubricate and cool the rotary grinding wheel for thereby increasing the grinding efficiency.

A problem of the prior art method of producing a curved-toothed bevel gear is that a local or spotty wear of the grinding wheel is liable to occur and therefore the life of the grinding wheel is considerably short.

SUMMARY OF THE INVENTION

In accordance with the present invention, there is provided an improved method of producing a curved-toothed bevel gear which comprises preparing a blank, generating teeth on the blank, processing the blank treatment, and grinding the blank by heat, in which the generating includes assuming an amount of deformation of a bottom land of each of the teeth caused by the heat treatment and forming the bottom land into a shape for compensating for the deformation.

The above method is effective for solving the above noted problem inherent in production of the curved-toothed bevel gear.

It is accordingly an object of the present invention to provide a method of producing a curved-toothed bevel gear which can prevent a local or spotty wear of a grinding wheel and elongate the life of same.

DESCRIPTION OF THE PREFERRED EMBODIMENT

Figure 4:
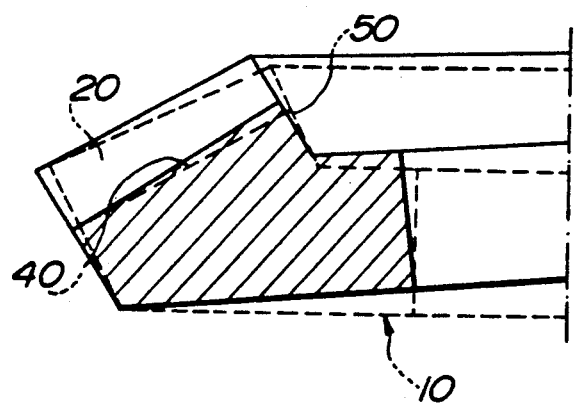
FIG. 4 is a view taken along the line IV—IV of FIG. 3 and shows, by solid lines, deformation of a toothed blank resulting from heat treatment.

By the experiments conducted by the applicant, it is found that heat treatment as carburizing, etc. causes, as shown in FIG. 4, the toothed blank 10 originally of the dotted line shape to deform into the solid line shape. This deformation makes it impossible to locate the rotary grinding wheel relative to the tooth space as desired and causes localized or spotty wear of the grinding wheel and therefore, shortened life of the grinding wheel.

More specifically, the heat treatment causes the toothed blank 10 to deform in such a manner that a radially inner portion is bend or raised more upward or more in one axial direction than a radially outer portion as seen from FIG. 4. For example, it is found that in case of a toothed blank of about 200 mm in outside diameter and of 30 mm in face width, a radially inner end 50 of each bottom land 40 is raised an amount ranging from 0.05 to 0.15 mm when processed by carburizing in an oil bath of the temperature ranging from 60° C. to 220° C.

When the tooth surfaces 20 and bottom lands 40 of the toothed blank 10 deformed in the above manner are ground by using the above described grinding wheel, a spotty or local wear is liable to occur in the top end portion of the grinding wheel since an amount of material to be removed by the top end portion of the grinding wheel is so large and further since it is difficult to supply a sufficient amount of grinding lubricant to the top end portion of the grinding wheel.

Furthermore, it is found that the above heat treatment can cause such a variation of the inclination of the tooth surface 20, i.e., such a variation of the pressure angle of the tooth surface 20 that increases the amount of material to be removed by the top end portion of the grinding wheel, thus enhancing the liability that the spotty or local wear ouccurs in the top end portion of the grinding wheel and therefore further shortening the life.

Figure 1:
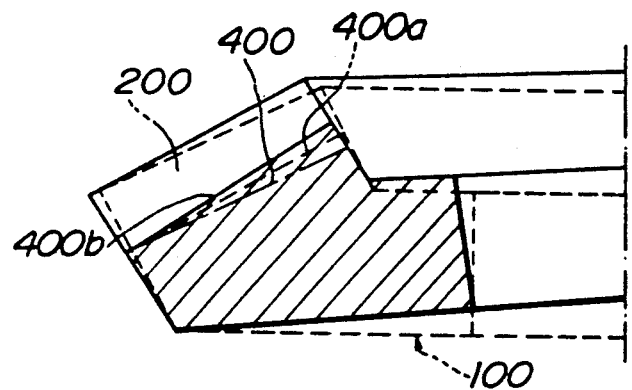
FIG. 1 is a view similar to FIG. 4 but shows a toothed blank utilized in a method of producing a curved-toothed bevel gear according to an embodiment of this invention.

Referring now mainly to FIG. 1, an improved method of this invention will be described hereinafter. In FIG. 1, a toothed blank 100 for a curved-toothed bevel gear is substantially similar to the above described blank 10 except that bottom lands 400 are so formed as indicated by the one-dot chain line, that is, the bottom lands 400 are so formed as to offset or compensate for deformation resulting from cementation. That is, in the generating of the teeth on the blank 100, an amount of deformation of each of the bottom lands 400 caused by the following heat treatment is first assumed. Then, each of the bottom lands is formed into a shape 400 diverting from a desired shape 400a by the assumed amount of deformation for thereby offsetting or compensating for the deformation. For example, in case of the toothed blank 100 of the size of 200 mm in outside diameter and 30 mm in face width, the bottom land 400 before carburizing forms an angle ranging from 5' to 30' with the bottom land 400a after cementation.

In this connection, in case of the toothed blank 10 of FIG. 4, its bottom land 40 takes the position indicated by the dotted line 400a in FIG. 1 before cementation.

After cementation, it takes the position indicated by the solid lines 400b after carburizing.

According to the present invention, each bottom land takes the position 400 indicated by the chain line before carburizing and is moved into the position 400a indicated by the dotted line when the toothed blank 100 is processed by heat treatment as carburizing. Accordingly, in grinding of the toothed blank 100, the grinding wheel (indicated by 700 in FIG. 2) can be positioned relative to the tooth slot or space of the toothed blank 100 as desired and accurately, thus making it possible to prevent spotty or local wear of the grinding wheel and therefore elongate the life.

Figure 2:
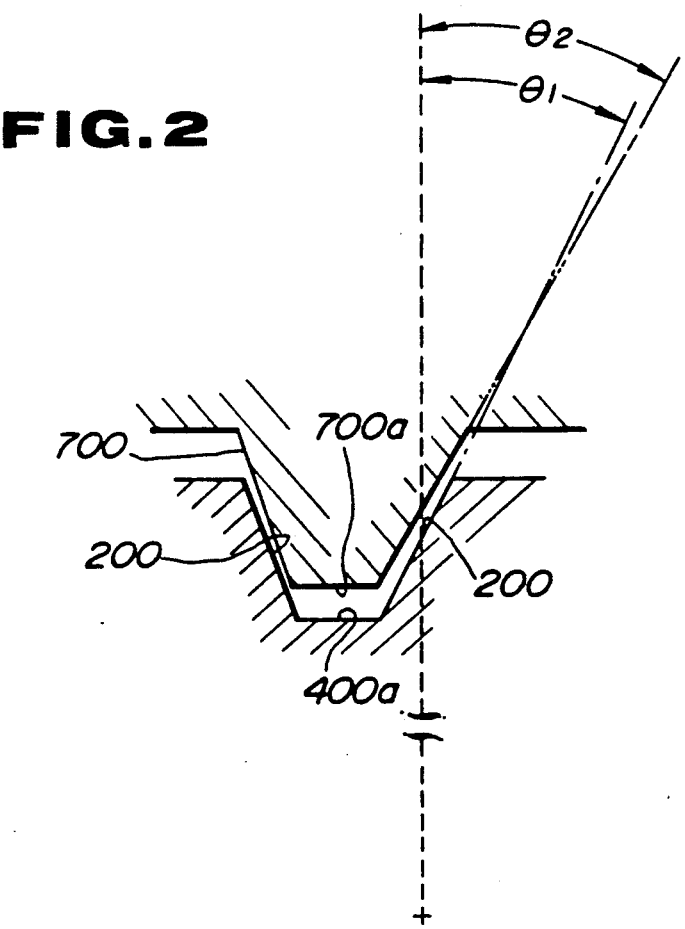
FIG. 2 is a schematic fragmentary sectional view of a toothed blank and a grinding wheel employed in a method producing a curved-toothed bevel gear according to another embodiment of this invention.
Figure 3:
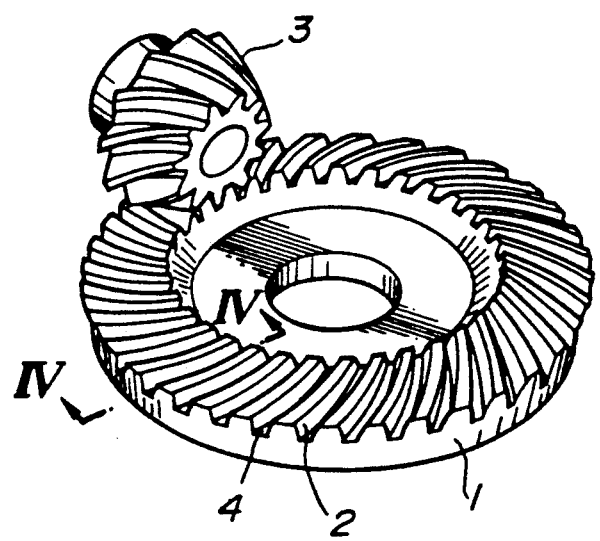
FIG. 3 is a perspective view of a curved-toothed bevel gear and pinion to which the present invention is applicable.

Referring additionally to FIG. 2, in addition to forming the bottom land 400 so as to offset or compensating for the deformation resulting from heat treatment, the pressure angle $\theta 1$ of the tooth surface 200 of the toothed blank 100 is set so as to be smaller by a predetermined amount than the corresponding pressure angle $\theta 2$ of the grinding wheel 700. This is attained by overcutting the tooth flank with a grinding wheel having a protrusion or protrusions at the top end portion 700a. For example, in case of the toothed blank 100 of 200 mm in diameter and 30 mm in face width and 13 mm in tooth depth, the pressure angle $\theta 1$ is set so as to be smaller than the pressure angle $\theta 2$ by the amount ranging from 15' to 1°.

With the above tooth surfaces 200, the material to be removed by the top end portion 700a of the grinding wheel 700 can be adjusted to a suitable amount, thus making it possible to prevent the spotty or local wear of the grinding wheel 700.

What is claimed is:

1. A method of producing a curved-toothed bevel gear, comprising the steps of:
   providing a blank;
   generating teeth on said blank;
   processing said blank by heat treatment; and
   grinding said teeth of said blank;
   in which said generating step includes assuming an amount of deformation of a bottom land of each of said teeth caused by said heat treatment and forming said bottom land into a shape for compensating for said deformation.

2. The method according to claim 1, wherein:
   said generating step further comprises forming said teeth in such a way as to have a pressure angle smaller than that of a grinding wheel used in said grinding.

3. A method of producing a curved-toothed bevel gear, comprising the steps of:
   providing a blank generating teeth on said blank;
   processing said blank by heat treatment; and
   grinding said teeth in such a way that a bottom land and its adjacent two tooth surfaces are ground at the same time;
   in which said generating step includes assuming an amount of movement of each of said bottom lands due to deformation of said blank at said heat treatment and forming sad bottom land in a position for compensating for said movement.

4. The method according to clam 1, wherein:
   said generating step further comprises forming said teeth in such a way as to have a pressure angle smaller than a pressure angle which said teeth are to have after said grinding.

5. A method of producing a curved-toothed bevel gear, comprising the steps of:
   providing a blank;
   generating teeth on said blank;
   processing said blank by heat treatment; and
   grinding said teeth of said blank;
   in which said generating step includes assuming an amount of deformation of a bottom land of each of said teeth caused by said heat treatment and forming said bottom land into a shape diverting from a desired shape by the assumed amount of deformation for thereby compensating for said deformation.

* * * * *